US009355090B2

(12) United States Patent
Goldsmith et al.

(10) Patent No.: US 9,355,090 B2
(45) Date of Patent: May 31, 2016

(54) IDENTIFICATION OF CANDIDATE CHARACTERS FOR TEXT INPUT

(75) Inventors: Deborah Eileen Goldsmith, Los Gatos, CA (US); Leland Douglas Collins, Jr., Palo Alto, CA (US); Chia-Chi Chou, Saratoga, CA (US); Maria Celia Vigil, Los Altos, CA (US)

(73) Assignee: APPLE INC., Cupertino, CA (US)

( * ) Notice: Subject to any disclaimer, the term of this patent is extended or adjusted under 35 U.S.C. 154(b) by 1081 days.

(21) Appl. No.: 12/167,044

(22) Filed: Jul. 2, 2008

(65) Prior Publication Data

US 2009/0295737 A1 Dec. 3, 2009

Related U.S. Application Data

(60) Provisional application No. 61/057,757, filed on May 30, 2008.

(51) Int. Cl.
*G06F 17/27* (2006.01)
*G06F 3/0488* (2013.01)
*G06F 3/01* (2006.01)

(52) U.S. Cl.
CPC .............. *G06F 17/276* (2013.01); *G06F 3/018* (2013.01); *G06F 3/04883* (2013.01)

(58) Field of Classification Search
CPC ........... G06K 9/18; G06F 3/023; G06F 17/28; G06F 17/21; G09G 5/00
USPC .......... 345/156, 168, 171, 173; 715/264–265, 715/703
See application file for complete search history.

(56) References Cited

U.S. PATENT DOCUMENTS

| 5,379,057 | A | 1/1995 | Clough et al. |
| 5,535,119 | A | 7/1996 | Ito et al. |
| 5,675,362 | A | 10/1997 | Clough et al. |
| 5,959,629 | A | 9/1999 | Masui |
| 6,115,053 | A | 9/2000 | Perlin |
| 6,278,968 | B1 * | 8/2001 | Franz et al. ........................ 704/3 |
| 6,323,846 | B1 | 11/2001 | Westerman et al. |
| 6,570,557 | B1 | 5/2003 | Westerman et al. |
| 6,661,409 | B2 | 12/2003 | Demartines et al. |
| 6,677,932 | B1 | 1/2004 | Westerman |

(Continued)

FOREIGN PATENT DOCUMENTS

| CN | 1292517 | | 4/2001 |
| CN | 1606753 | A | 4/2005 |

(Continued)

OTHER PUBLICATIONS

Authorized officer Philippe Becamel, International Preliminary Report on Patentability in PCT/US2009/033696 mailed Sep. 16, 2010, 7 pages.

(Continued)

*Primary Examiner* — Kenneth Bukowski
(74) *Attorney, Agent, or Firm* — Morrison & Foerster LLP

(57) ABSTRACT

Methods, systems, devices, and apparatus, including computer program products, for identifying candidates for text entry. One or more inputs entering one or more characters are received. One or more first candidate characters are identified and presented for the inputs using a first dictionary. One or more second candidate characters related to a respective first candidate character are identified and presented.

12 Claims, 11 Drawing Sheets

(56) References Cited

U.S. PATENT DOCUMENTS

| | | | |
|---|---|---|---|
| 6,766,179 B1* | 7/2004 | Shiau et al. ............... | 455/566 |
| 6,888,536 B2 | 5/2005 | Westerman et al. | |
| 7,030,863 B2 | 4/2006 | Longe et al. | |
| 7,096,432 B2 | 8/2006 | Huapaya et al. | |
| 7,137,076 B2 | 11/2006 | Iwema et al. | |
| 7,147,562 B2 | 12/2006 | Ohara et al. | |
| 7,619,677 B2 | 11/2009 | Matsuda et al. | |
| 2002/0167545 A1 | 11/2002 | Kang et al. | |
| 2002/0168107 A1* | 11/2002 | Tang et al. ............... | 382/187 |
| 2003/0024375 A1 | 2/2003 | Sitrick | |
| 2003/0100965 A1 | 5/2003 | Sitrick | |
| 2003/0160817 A1 | 8/2003 | Ishida et al. | |
| 2003/0216913 A1 | 11/2003 | Keely | |
| 2004/0140956 A1 | 7/2004 | Kushler et al. | |
| 2004/0230912 A1 | 11/2004 | Clow et al. | |
| 2005/0024341 A1* | 2/2005 | Gillespie et al. ........... | 345/173 |
| 2005/0099408 A1 | 5/2005 | Seto et al. | |
| 2005/0152600 A1 | 7/2005 | Chen et al. | |
| 2005/0174333 A1 | 8/2005 | Robinson et al. | |
| 2006/0053387 A1 | 3/2006 | Ording | |
| 2006/0062461 A1* | 3/2006 | Longe et al. ............... | 382/185 |
| 2006/0085757 A1 | 4/2006 | Andre et al. | |
| 2006/0117067 A1 | 6/2006 | Wright et al. | |
| 2006/0144211 A1 | 7/2006 | Yoshimoto | |
| 2006/0265648 A1* | 11/2006 | Rainisto et al. ............. | 715/534 |
| 2006/0274051 A1 | 12/2006 | Longe et al. | |
| 2007/0024736 A1 | 2/2007 | Matsuda et al. | |
| 2007/0120822 A1 | 5/2007 | Iso | |
| 2008/0025613 A1* | 1/2008 | Kumar et al. ............... | 382/189 |
| 2008/0030481 A1* | 2/2008 | Gunn et al. ............... | 345/173 |
| 2008/0072156 A1 | 3/2008 | Sitrick | |
| 2008/0094356 A1 | 4/2008 | Ording et al. | |
| 2009/0037837 A1 | 2/2009 | Raghunath et al. | |
| 2009/0051661 A1 | 2/2009 | Kraft et al. | |
| 2009/0058823 A1 | 3/2009 | Kocienda | |
| 2009/0077464 A1 | 3/2009 | Goldsmith et al. | |
| 2009/0193361 A1 | 7/2009 | Lee et al. | |
| 2009/0225041 A1 | 9/2009 | Kida et al. | |
| 2009/0226091 A1 | 9/2009 | Goldsmith et al. | |
| 2009/0265669 A1 | 10/2009 | Kida et al. | |

FOREIGN PATENT DOCUMENTS

| | | |
|---|---|---|
| CN | 1949158 | 4/2007 |
| CN | 101013344 | 8/2007 |
| EP | 1 698 982 | 9/2006 |
| JP | 08-272787 | 10/1996 |
| JP | 10-049272 | 2/1998 |
| JP | 2000-112636 | 4/2000 |
| JP | 2000-222401 | 8/2000 |
| JP | 2002-108543 | 4/2002 |
| JP | 03-314276 | 8/2002 |
| JP | 2002-0325965 | 11/2002 |
| JP | 2005-092441 | 4/2005 |
| WO | WO 00/74240 | 12/2000 |
| WO | WO 2005/064587 | 7/2005 |
| WO | WO 2007/037809 | 4/2007 |
| WO | WO 2007/047188 | 4/2007 |
| WO | WO 2007/67858 | 6/2007 |
| WO | WO 2007/070223 | 6/2007 |
| WO | WO 2009/032483 | 3/2009 |
| WO | WO 2009/111138 | 9/2009 |

OTHER PUBLICATIONS

International Preliminary Report on Patentability in International Application No. PCT/US2009/072803 mailed Mar. 18, 2010.
Translated First Office Action dated Jul. 29, 2010 issued in Chinese Application No. 200910118235.X, 9 pages.
T. Masui, "An Efficient Text Input Method for Pen-based Computers," Proceedings of the ACM Conference on Human Factors in Computing System (CHI '98), Apr. 1998, ACM press, pp. 328-335.
T. Masui, "POBox: An Efficient Text Input Method for Handheld and Ubiquitous Computers," Proceedings of the Internation Symposium on Handheld and Ubiquitous Computer (HUC '99), Sep. 1999, pp. 289-300.
C. Liu et al., "Online Recognition of Chinese Characters: The State-of-the-Art," IEEE Transactions on Pattern Analysis and Machine Intelligence, vol. 26, No. 2, Feb. 2004, pp. 198-213.
H. Sacher, "Interactions in Chinese: Designing Interfaces for Asian Languages," Interactions Magazine, vol. 5, Issue 5, Sep.-Oct. 1998, pp. 28-38.
International Search Report and Written Opinion, dated Apr. 29, 2009, issued in International Application No. PCT/US2009/033696.
International Search Report and Written Opinion, dated Feb. 18, 2009, issued in International Application No. PCT/US2009/072803.
Invitation to Pay Fees and Partial International Search Report, dated Nov. 11, 2008, issued in International Application No. PCT/US2009/072803.
Kida et al., "Language Input Interface on a Device", U.S. Appl. No. 12/107,711, filed Apr. 22, 2008.
Chou, "Zhuyin Input Interface on a Device", U.S. Appl. No. 12/476,121, filed Jun. 1, 2009.
Yoshikawa, "i-Phone First Impression," [online], Jul. 10, 2007, [Search on Nov. 22, 2011], Internet (English translation).
Office Action dated Nov. 22, 2012, received in Chinese Patent Application No. 200910145649.1, which corresponds to U.S Appl. No. 12/167,044, 13 pages (Goldsmith).
Office Action dated Jul. 2, 2013, received in Chinese Patent Application No. 200910145649.1, which corresponds to U.S Appl. No. 12/167,044, 10 pages (Goldsmith).
Notice of Allowance received for Chinese Patent Application No. 200910145649.1, mailed on Apr. 29, 2014, 1 page.

* cited by examiner

IDENTIFICATION OF CANDIDATE CHARACTERS FOR TEXT INPUT

RELATED APPLICATION

This application claims the benefit under 35 U.S.C. §119 of U.S. Provisional Application No. 61/057,757, titled "Identification of Candidate Characters for Text Input," filed May 30, 2008, which is incorporated by reference herein in its entirety.

BACKGROUND

The subject matter of this specification is related generally to text input interfaces.

A computer device can be configured to receive input of text and characters from a computer keyboard. Modern computer keyboards are composed of rectangular or near rectangular keys, and characters, such as the letters A-Z in the English alphabet, are usually engraved or printed on the keys. Generally, each press of a key corresponds to typing of a single character.

Traditional computer keyboards may be too large for portable devices, such as mobile phones, multimedia players, or personal digital assistants (PDAs). Some portable devices include a smaller version of the traditional computer keyboard or use a virtual keyboard to receive user input. A virtual keyboard can be of the form of a software application or a feature of a software application to simulate a computer keyboard. For example, in a portable device with a touch-sensitive display, a virtual keyboard can be used by a user to input text by selecting or tabbing areas of the touch-sensitive display corresponding to keys of the virtual keyboard.

These smaller keyboards and virtual keyboards may have keys that correspond to more than one character. For example, some of the keys can, by default, correspond to a character in the English language, for example, the letter "a," and may also correspond to other additional characters, such as another letter or the letter with an accent option, e.g., the character "ä," or other characters with accent options. Because of the physical limitations (e.g., size) of the virtual keyboard, a user may find it difficult to type characters not readily available on the virtual keyboard.

Input methods for devices having multi-language environments can present unique challenges with respect to input and spelling correction which may need to be tailored to the selected language to ensure accuracy and an efficient workflow.

SUMMARY

In general, one aspect of the subject matter described in this specification can be embodied in methods that include the actions of receiving an input entering a character, identifying and presenting one or more first candidate characters based on the received input using a first dictionary, and identifying and presenting one or more second candidate characters related to a respective first candidate character. Other embodiments of this aspect include corresponding systems, apparatus, devices, computer program products, and computer readable media.

In general, another aspect of the subject matter described in this specification can be embodied in methods that include the actions of receiving inputs entering a string having a plurality of characters, and identifying and presenting a candidate character that is a combination of the plurality of characters. Other embodiments of this aspect include corresponding systems, apparatus, devices, computer program products, and computer readable media.

In general, another aspect of the subject matter described in this specification can be embodied in methods that include the actions of receiving one or more inputs entering a string one or more characters, and identifying and presenting one or more candidate character, where each of the candidate characters forms a respective word with one or more characters at the tail end of the string. Other embodiments of this aspect include corresponding systems, apparatus, devices, computer program products, and computer readable media.

Particular embodiments of the subject matter described in this specification can be implemented to realize one or more of the following advantages. Candidate characters that may not be identified by a handwriting recognition engine can be made available to a user. Characters can be made available to users in different ways. Performance of the handwriting recognition interface is enhanced. Certain complicated characters can be entered by a user more easily.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Example Mobile Device

Figure 1:
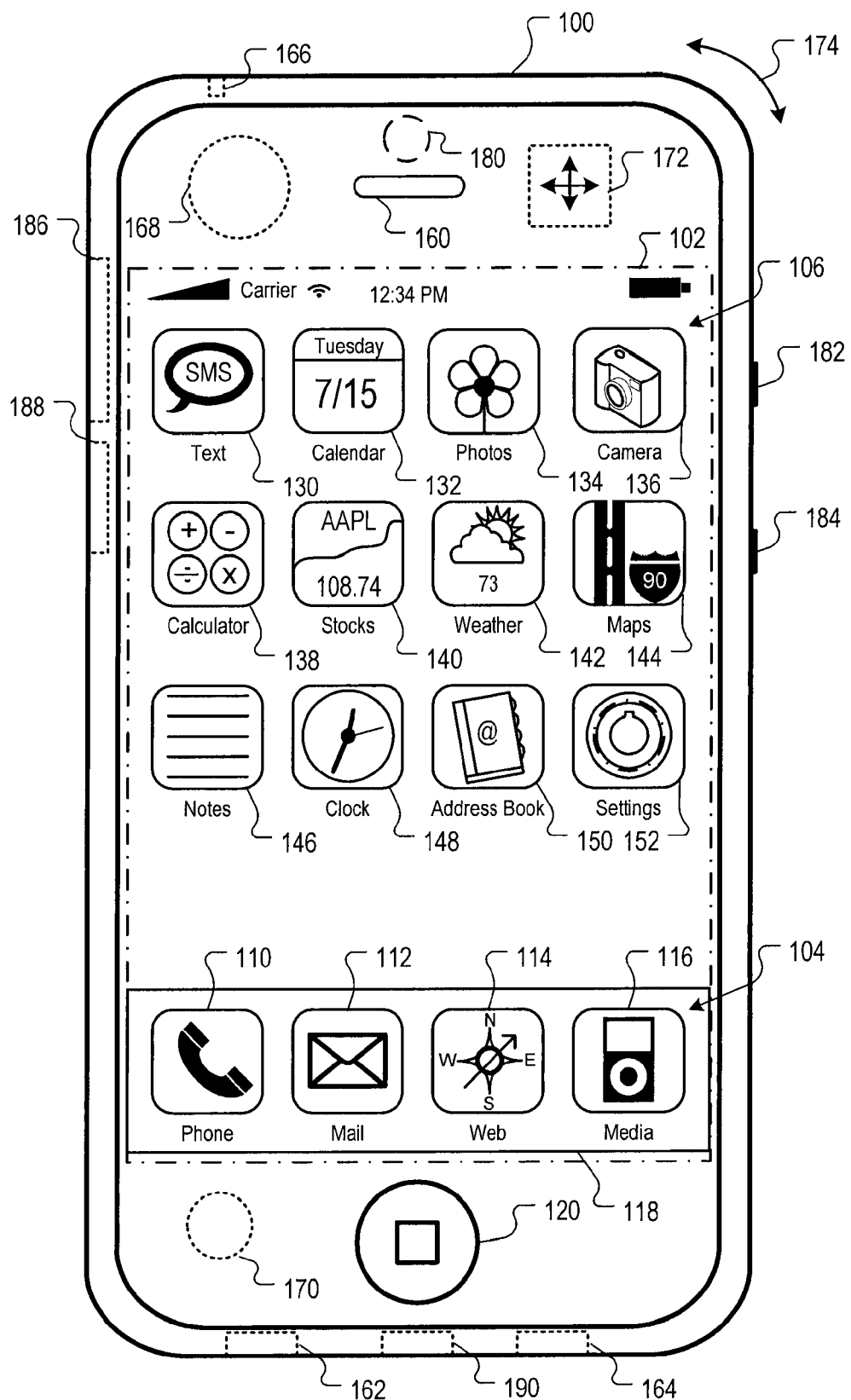
FIG. 1 is a block diagram of an example mobile device.

FIG. 1 is a block diagram of an example mobile device 100. The mobile device 100 can be, for example, a handheld computer, a personal digital assistant, a cellular telephone, a network appliance, a camera, a smart phone, an enhanced general packet radio service (EGPRS) mobile phone, a network base station, a media player, a navigation device, an email device, a game console, or a combination of any two or more of these data processing devices or other data processing devices.

Mobile Device Overview

In some implementations, the mobile device 100 includes a touch-sensitive display 102. The touch-sensitive display 102 can implement liquid crystal display (LCD) technology, light emitting polymer display (LPD) technology, or some other display technology. The touch sensitive display 102 can be sensitive to haptic and/or tactile contact with a user.

In some implementations, the touch-sensitive display 102 can comprise a multi-touch-sensitive display 102. A multi-touch-sensitive display 102 can, for example, process multiple simultaneous touch points, including processing data related to the pressure, degree, and/or position of each touch point. Such processing facilitates gestures and interactions with multiple fingers, chording, and other interactions. Other touch-sensitive display technologies can also be used, e.g., a display in which contact is made using a stylus or other pointing device. Some examples of multi-touch-sensitive display technology are described in U.S. Pat. Nos. 6,323,846, 6,570,557, 6,677,932, and 6,888,536, each of which is incorporated by reference herein in its entirety.

In some implementations, the mobile device 100 can display one or more graphical user interfaces on the touch-sensitive display 102 for providing the user access to various system objects and for conveying information to the user. In some implementations, the graphical user interface can include one or more display objects 104, 106. In the example shown, the display objects 104, 106, are graphic representations of system objects. Some examples of system objects include device functions, applications, windows, files, alerts, events, or other identifiable system objects.

Example Mobile Device Functionality

In some implementations, the mobile device 100 can implement multiple device functionalities, such as a telephony device, as indicated by a phone object 110; an e-mail device, as indicated by the e-mail object 112; a network data communication device, as indicated by the Web object 114; a Wi-Fi base station device (not shown); and a media processing device, as indicated by the media player object 116. In some implementations, particular display objects 104, e.g., the phone object 110, the e-mail object 112, the Web object 114, and the media player object 116, can be displayed in a menu bar 118. In some implementations, device functionalities can be accessed from a top-level graphical user interface, such as the graphical user interface illustrated in FIG. 1. Touching one of the objects 110, 112, 114, or 116 can, for example, invoke corresponding functionality.

In some implementations, the mobile device 100 can implement network distribution functionality. For example, the functionality can enable the user to take the mobile device 100 and provide access to its associated network while traveling. In particular, the mobile device 100 can extend Internet access (e.g., Wi-Fi) to other wireless devices in the vicinity. For example, mobile device 100 can be configured as a base station for one or more devices. As such, mobile device 100 can grant or deny network access to other wireless devices.

In some implementations, upon invocation of device functionality, the graphical user interface of the mobile device 100 changes, or is augmented or replaced with another user interface or user interface elements, to facilitate user access to particular functions associated with the corresponding device functionality. For example, in response to a user touching the phone object 110, the graphical user interface of the touch-sensitive display 102 may present display objects related to various phone functions; likewise, touching of the email object 112 may cause the graphical user interface to present display objects related to various e-mail functions; touching the Web object 114 may cause the graphical user interface to present display objects related to various Web-surfing functions; and touching the media player object 116 may cause the graphical user interface to present display objects related to various media processing functions.

In some implementations, the top-level graphical user interface environment or state of FIG. 1 can be restored by pressing a button 120 located near the bottom of the mobile device 100. In some implementations, each corresponding device functionality may have corresponding "home" display objects displayed on the touch-sensitive display 102, and the graphical user interface environment of FIG. 1 can be restored by pressing the "home" display object.

In some implementations, the top-level graphical user interface can include additional display objects 106, such as a short messaging service (SMS) object 130, a calendar object 132, a photos object 134, a camera object 136, a calculator object 138, a stocks object 140, a weather object 142, a maps object 144, a notes object 146, a clock object 148, an address book object 150, and a settings object 152. Touching the SMS display object 130 can, for example, invoke an SMS messaging environment and supporting functionality; likewise, each selection of a display object 132, 134, 136, 138, 140, 142, 144, 146, 148, 150, and 152 can invoke a corresponding object environment and functionality.

Additional and/or different display objects can also be displayed in the graphical user interface of FIG. 1. For example, if the device 100 is functioning as a base station for other devices, one or more "connection" objects may appear in the graphical user interface to indicate the connection. In some implementations, the display objects 106 can be configured by a user, e.g., a user may specify which display objects 106 are displayed, and/or may download additional applications or other software that provides other functionalities and corresponding display objects.

In some implementations, the mobile device 100 can include one or more input/output (I/O) devices and/or sensor devices. For example, a speaker 160 and a microphone 162 can be included to facilitate voice-enabled functionalities, such as phone and voice mail functions. In some implementations, an up/down button 184 for volume control of the speaker 160 and the microphone 162 can be included. The mobile device 100 can also include an on/off button 182 for a ring indicator of incoming phone calls. In some implementations, a loud speaker 164 can be included to facilitate hands-free voice functionalities, such as speaker phone functions. An audio jack 166 can also be included for use of headphones and/or a microphone.

In some implementations, a proximity sensor 168 can be included to facilitate the detection of the user positioning the mobile device 100 proximate to the user's ear and, in response, to disengage the touch-sensitive display 102 to prevent accidental function invocations. In some implementations, the touch-sensitive display 102 can be turned off to conserve additional power when the mobile device 100 is proximate to the user's ear.

Other sensors can also be used. For example, in some implementations, an ambient light sensor 170 can be utilized to facilitate adjusting the brightness of the touch-sensitive display 102. In some implementations, an accelerometer 172 can be utilized to detect movement of the mobile device 100, as indicated by the directional arrow 174. Accordingly, display objects and/or media can be presented according to a detected orientation, e.g., portrait or landscape. In some implementations, the mobile device 100 may include circuitry and sensors for supporting a location determining capability, such as that provided by the global positioning system (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile device 100 or provided as a separate device that can be coupled to the mobile device 100 through an interface (e.g., port device 190) to provide access to location-based services.

In some implementations, a port device 190, e.g., a Universal Serial Bus (USB) port, or a docking port, or some other wired port connection, can be included. The port device 190 can, for example, be utilized to establish a wired connection to other computing devices, such as other communication devices 100, network access devices, a personal computer, a printer, a display screen, or other processing devices capable of receiving and/or transmitting data. In some implementations, the port device 190 allows the mobile device 100 to synchronize with a host device using one or more protocols, such as, for example, the TCP/IP, HTTP, UDP and any other known protocol.

The mobile device 100 can also include a camera lens and sensor 180. In some implementations, the camera lens and sensor 180 can be located on the back surface of the mobile device 100. The camera can capture still images and/or video.

The mobile device 100 can also include one or more wireless communication subsystems, such as an 802.11b/g communication device 186, and/or a Bluetooth™ communication device 188. Other communication protocols can also be supported, including other 802.x communication protocols (e.g., WiMax, Wi-Fi, 3G), code division multiple access (CDMA), global system for mobile communications (GSM), Enhanced Data GSM Environment (EDGE), etc.

Example Mobile Device Architecture

Figure 2:
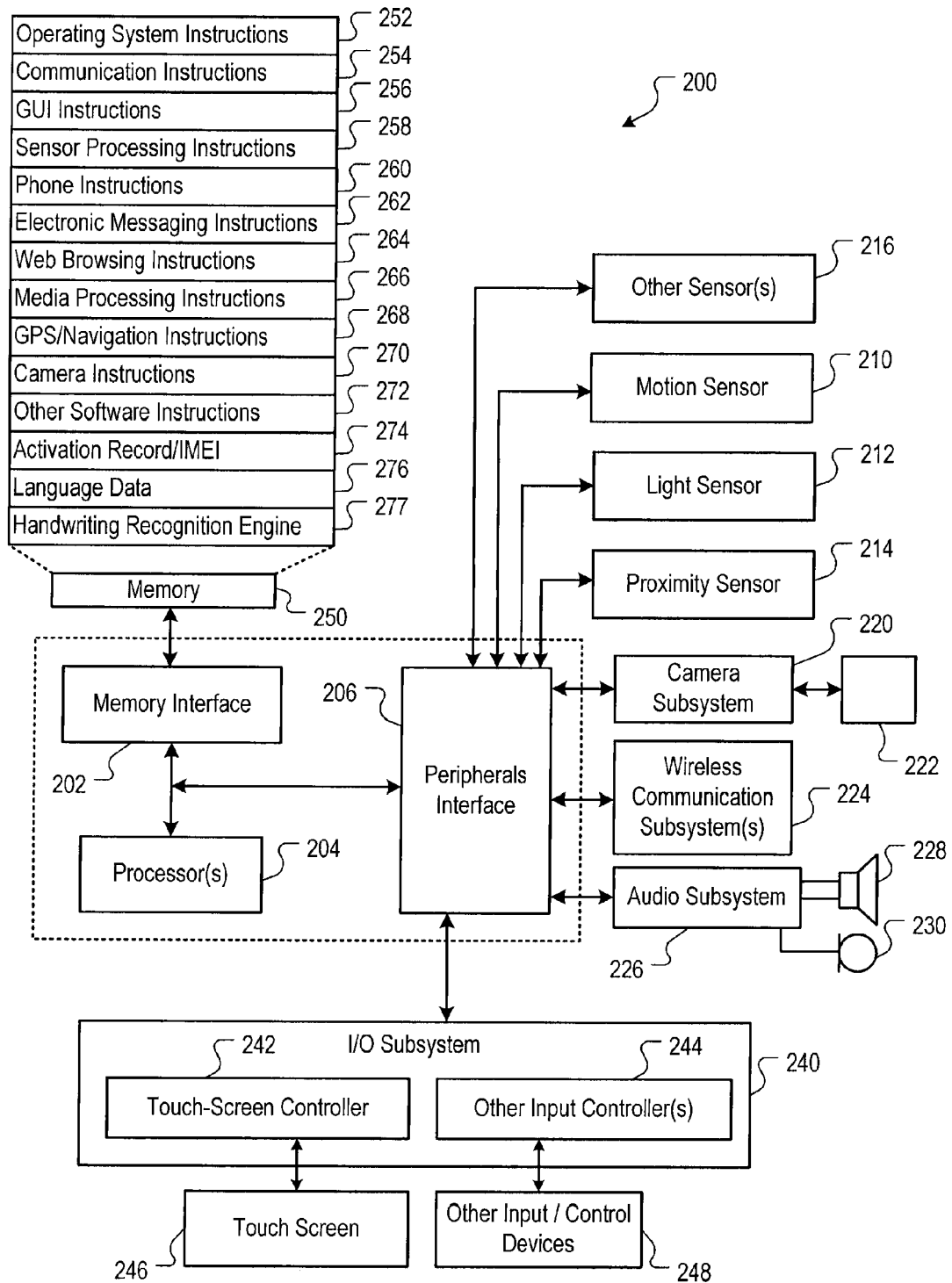
FIG. 2 is a block diagram of an example implementation of the mobile device of FIG. 1.

FIG. 2 is a block diagram 200 of an example implementation of the mobile device 100 of FIG. 1. The mobile device 100 can include a memory interface 202, one or more data processors, image processors and/or central processing units 204, and a peripherals interface 206. The memory interface 202, the one or more processors 204 and/or the peripherals interface 206 can be separate components or can be integrated in one or more integrated circuits. The various components in the mobile device 100 can be coupled by one or more communication buses or signal lines.

Sensors, devices, and subsystems can be coupled to the peripherals interface 206 to facilitate multiple functionalities. For example, a motion sensor 210, a light sensor 212, and a proximity sensor 214 can be coupled to the peripherals interface 206 to facilitate the orientation, lighting, and proximity functions described with respect to FIG. 1. Other sensors 216 can also be connected to the peripherals interface 206, such as a positioning system (e.g., GPS receiver), a temperature sensor, a biometric sensor, or other sensing device, to facilitate related functionalities.

A camera subsystem 220 and an optical sensor 222, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 224, which can include radio frequency receivers and transmitters and/or optical (e.g., infrared) receivers and transmitters. The specific design and implementation of the communication subsystem 224 can depend on the communication network(s) over which the mobile device 100 is intended to operate. For example, a mobile device 100 may include communication subsystems 224 designed to operate over a GSM network, a GPRS network, an EDGE network, a Wi-Fi or WiMax network, and a Bluetooth™ network. In particular, the wireless communication subsystems 224 may include hosting protocols such that the device 100 may be configured as a base station for other wireless devices.

An audio subsystem 226 can be coupled to a speaker 228 and a microphone 230 to facilitate voice-enabled functions, such as voice recognition, voice replication, digital recording, and telephony functions.

The I/O subsystem 240 can include a touch screen controller 242 and/or other input controller(s) 244. The touch-screen controller 242 can be coupled to a touch screen 246. The touch screen 246 and touch screen controller 242 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 246.

The other input controller(s) 244 can be coupled to other input/control devices 248, such as one or more buttons, rocker switches, thumb-wheel, infrared port, USB port, and/or a pointer device such as a stylus. The one or more buttons (not shown) can include an up/down button for volume control of the speaker 228 and/or the microphone 230.

In one implementation, a pressing of the button for a first duration may disengage a lock of the touch screen 246; and a pressing of the button for a second duration that is longer than the first duration may turn power to the mobile device 100 on or off. The user may be able to customize a functionality of one or more of the buttons. The touch screen 246 can, for example, also be used to implement virtual or soft buttons and/or a keyboard.

In some implementations, the mobile device 100 can present recorded audio and/or video files, such as MP3, AAC, and MPEG files. In some implementations, the mobile device 100 can include the functionality of an MP3 player, such as an iPod™. The mobile device 100 may, therefore, include a 36-pin connector that is compatible with the iPod. Other input/output and control devices can also be used.

The memory interface 202 can be coupled to memory 250. The memory 250 can include high-speed random access memory and/or non-volatile memory, such as one or more magnetic disk storage devices, one or more optical storage devices, and/or flash memory (e.g., NAND, NOR). The memory 250 can store an operating system 252, such as Darwin, RTXC, LINUX, UNIX, OS X, WINDOWS, or an embedded operating system such as VxWorks. The operating system 252 may include instructions for handling basic system services and for performing hardware dependent tasks. In some implementations, the operating system 252 can be a kernel (e.g., UNIX kernel).

The memory 250 may also store communication instructions 254 to facilitate communicating with one or more additional devices, one or more computers and/or one or more servers. The memory 250 may include graphical user interface instructions 256 to facilitate graphic user interface processing; sensor processing instructions 258 to facilitate sensor-related processing and functions; phone instructions 260 to facilitate phone-related processes and functions; electronic messaging instructions 262 to facilitate electronic-messaging related processes and functions; web browsing instructions 264 to facilitate web browsing-related processes and functions; media processing instructions 266 to facilitate media processing-related processes and functions; GPS/Navigation instructions 268 to facilitate GPS and navigation-related processes and instructions; camera instructions 270 to facilitate camera-related processes and functions; and/or other software instructions 272 to facilitate other processes and functions, e.g., security processes and functions. The memory 250 may also store other software instructions (not shown), such as web video instructions to facilitate web video-related processes and functions; and/or web shopping instructions to facilitate web shopping-related processes and functions. In some implementations, the media processing instructions 266 are divided into audio processing instructions and video processing instructions to facilitate audio processing-related processes and functions and video processing-related processes and functions, respectively. An activation record and International Mobile Equipment Identity (IMEI) 274 or similar hardware identifier can also be stored in memory 250.

Language data 276 can also be stored in memory 250. Language data 276 can include, for example, word dictionaries (i.e., list of possible words in a language) for one or more languages, dictionaries of characters and corresponding phonetics and characteristics (e.g., stroke positions and order, etc.), one or more corpuses or dictionaries of characters and character compounds (e.g., words, phrases), and so on. In some implementations, memory 250 stores instructions for a handwriting recognition engine 277 for recognizing handwritten input and matching the input to one or more candidate characters.

Each of the above identified instructions and applications can correspond to a set of instructions for performing one or more functions described above. These instructions need not be implemented as separate software programs, procedures, or modules. The memory 250 can include additional instructions or fewer instructions. Furthermore, various functions of the mobile device 100 may be implemented in hardware and/or in software, including in one or more signal processing and/or application specific integrated circuits.

Handwriting Interface

Figure 3A:
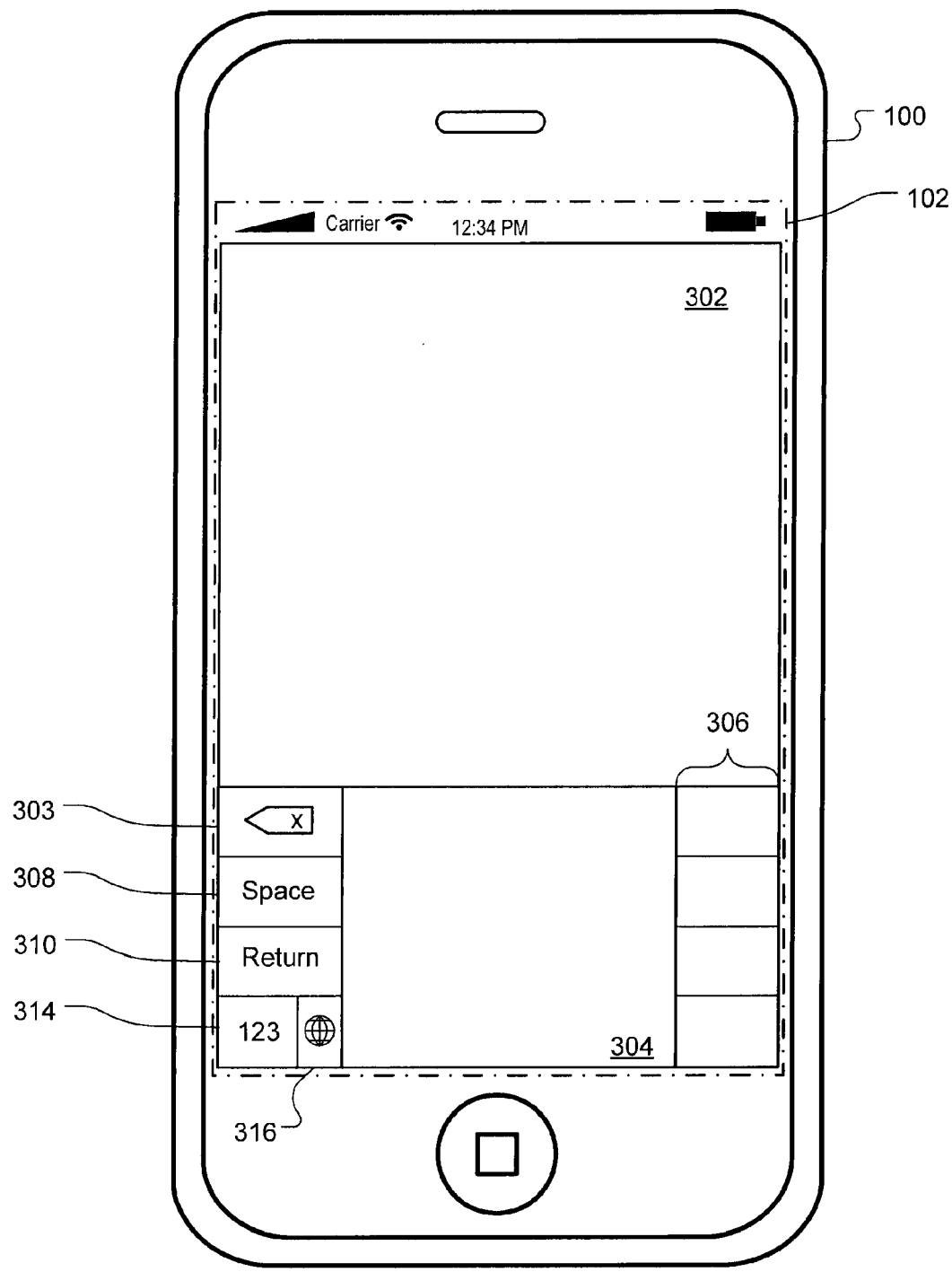
FIGS. 3A-3B illustrate an example user interface for entering characters using handwriting recognition.
Figure 3B:
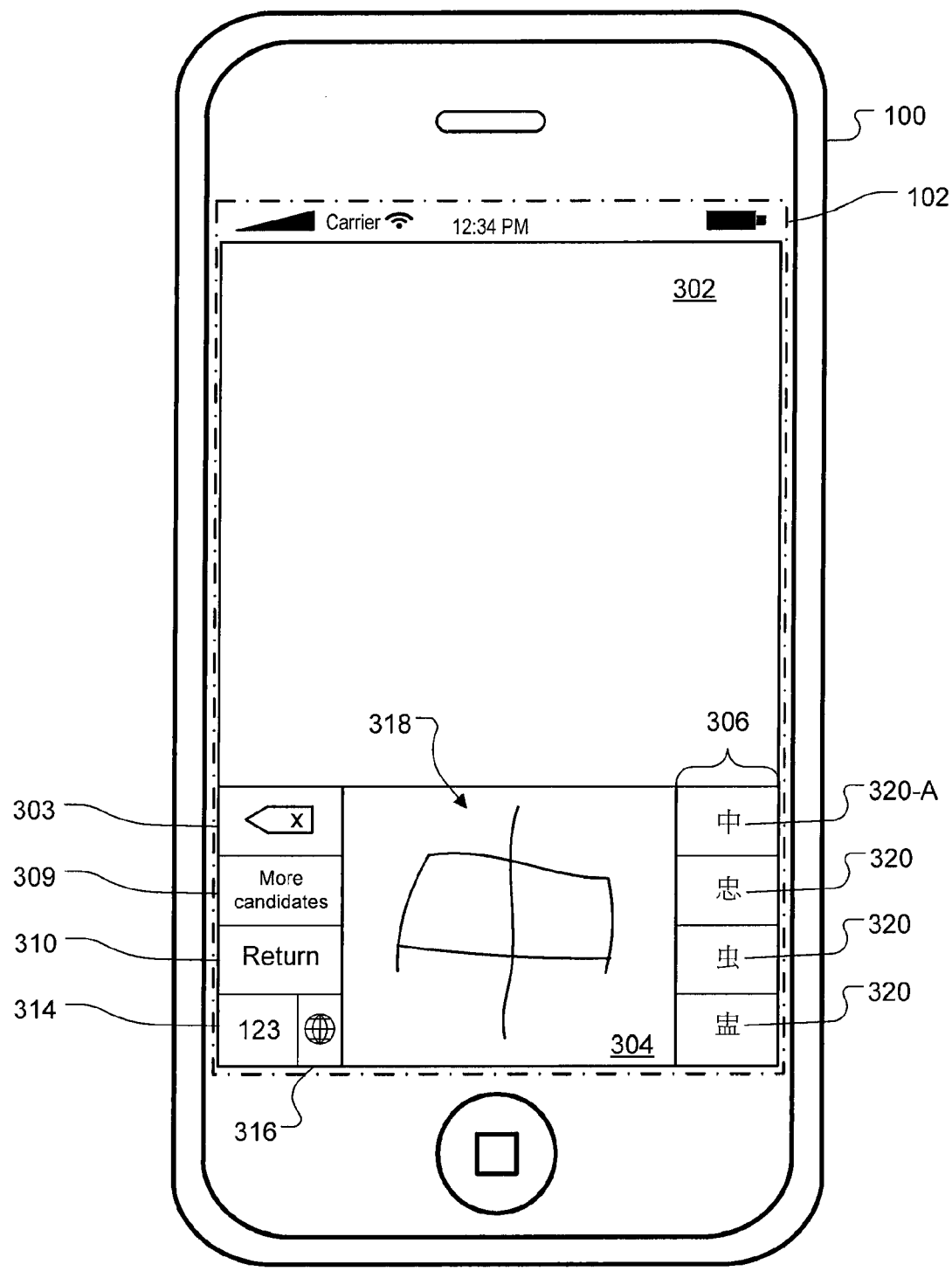

FIGS. 3A-3B illustrate an example user interface for entering characters using handwriting recognition on a mobile device 100. Mobile device 100 can display a composition area 302 and a handwriting area 304 on the touch-sensitive display 102. Input text can be displayed in the composition area 302. In some implementations, the composition area 302 is the area in an application (e.g., a note-taking application, an email application, etc.) where input text is displayed.

For convenience, the implementations described in this specification are described in reference to entry of Chinese characters (simplified and/or traditional). It should be appreciated that the described implementations can be adapted to entry of text in other languages or even a mix of multiple languages.

The handwriting area 304 provides a region on the touch-sensitive display 102 where a user can draw or handwrite an input. The touch-sensitive display 102 can display one or more virtual keys, buttons, or the like, that provide additional functionality. In some implementations, the additional keys include one or more of: a delete/backspace key 303 for deleting input characters; a space key 308 for entering white space; a return key 310 for entering a line break, paragraph break, or the like; and numbers and punctuation keyboard toggle key 314 for toggling between the handwriting area 304 and a virtual keyboard with number and punctuation keys, and an input method key 316 for switching between a plurality of input methods for one or more languages (e.g., QWERTY keyboard, Japanese kana keyboard, etc.). Other keys for other functionality are possible.

In some implementations, the handwriting area 304 is accompanied by one or more virtual candidate keys 306. In some implementations, the virtual candidate keys 306 are arranged in a vertical column adjacent to the handwriting area 304. A candidate for a handwritten input can be selected using the candidate keys 306; the selected candidate confirms the character that the user attempted to draw in the handwriting area 304.

FIG. 3B illustrates an example handwritten input 318 written in the handwriting area 304. A user can write a handwritten input 318 into the handwriting area 304 by writing one or more strokes (e.g., lines, curves, etc.) in the handwriting area 304. After the drawing of the input 318 into the handwriting area 304, one or more candidate characters 320 for the input 318 are presented in the candidate keys 306. In some implementations, the candidate characters 320 are identified by a handwriting recognition engine (e.g., handwriting recognition engine 277) based on the handwritten input 318. The handwriting recognition engine recognizes handwritten input and, based on the characteristics of the handwritten input 318, identifies one or more candidates from a dictionary. In some implementations, the candidates identified by the handwriting recognition engine are, according to the engine, the "best" matches to the handwritten input 318. The characteristics can include the strokes and the start/end points of these strokes, the positions of the strokes and start/end points relative to each other, and the order in which the strokes were written. An example of a handwriting recognition engine is disclosed in Liu et al., "Online Recognition of Chinese Characters: The State-of-the-Art," *IEEE Transactions on Pattern Analysis and Machine Intelligence*, Vol. 26, No. 2, pp. 198-213, February 2004. Another example of a handwriting recognition engine is disclosed in Sacher, "Interactions in Chinese: Designing Interfaces for Asian Languages," Interactions Magazine, Volume 5, Issue 5, September-October 1998, pages 28-38.

In some implementations, when candidate characters are shown in the candidate keys 306 and there are more candidate characters available than can be shown all at once in the available virtual candidate keys 306, the space key 308 can be replaced by a "more candidates" key 309. By hitting the "more candidates" key 309, the user can page through or cycle through the "list" of candidates. In some implementations, the user can also scroll through the list of candidates by performing a flicking gesture (up or down) on the touch-sensitive display 102.

In some implementations, the candidates are identified and ordered using predictive text and/or error correction techniques. Examples of predictive text techniques are disclosed in Masui, "An Efficient Text Input Method for Pen-based Computers," in Proceedings of the ACM Conference on Human Factors in Computing Systems (CHI '98), Addison-Wesley, April 1998, pp. 328-335; and Masui, "POBox: An Efficient Text Input Method for Handheld and Ubiquitous Computers," in Proceedings of the International Symposium on Handheld and Ubiquitous Computing (HUC '99), pp. 289-300, September 1999.

Figure 3C:
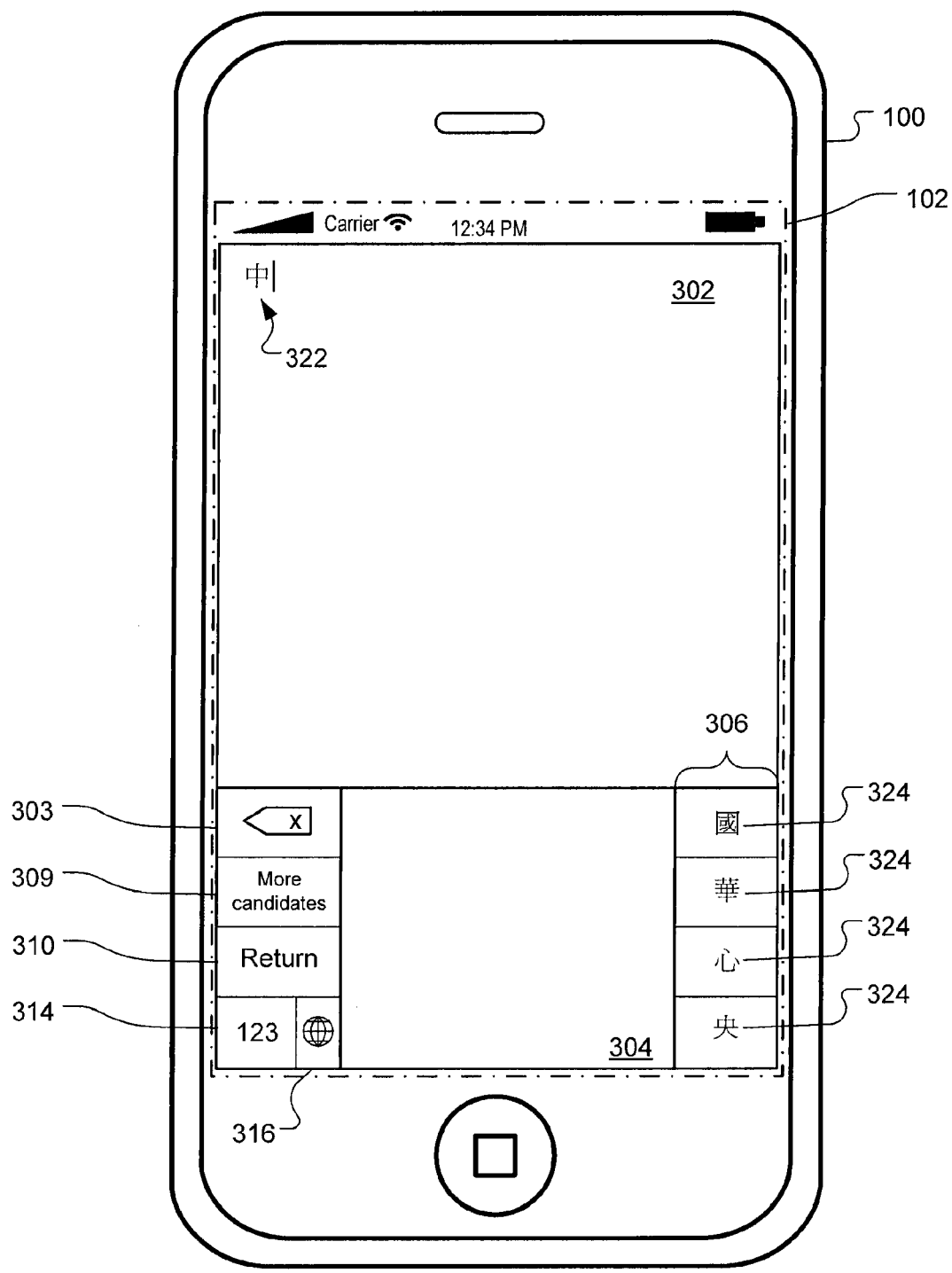
FIG. 3C illustrates an example of completion candidates.

The user can select one of the candidate characters 320 to enter that character. For example, if the user selects candidate character 320-A (in FIG. 3B, the character "中"), then that character is displayed in the composition area 302 as part of the current input 322, as shown in FIG. 3C. In some implementations, if the user does not select a candidate character for the input and does not cancel the input, the first candidate character (e.g., the candidate character that is displayed in the topmost candidate character key 306 at the moment, or the "best match" candidate character) is automatically selected by the device 100 after a predefined amount of time has elapsed (e.g., 3 seconds). After a candidate is selected, the handwriting area 304 can be cleared so that the handwriting area 304 can be ready to receive another handwritten input.

In some implementations, after a candidate character 320 is selected (or more generally, after any character is entered), additional candidates can be shown in the candidate keys 306. For example, completion candidates 324 can be shown in the candidate keys 306, as illustrated in FIG. 3C. Completion candidates are candidates (each having one or more characters) that "complement" a string of one or more characters in the current input 322 (e.g., one or more characters at the end of the current input 322, one or more characters selected by the user, etc.) to form multi-character words or phrases, or more generally, to form compounds of multiple characters. For example, for the character "中" in the current input 322, completion candidates 324 can include "國" (to form the word "中國" (China)), "華" (to form the word "中華" (China)), "心" (to form the word "中心" (center)), and "央" (to form the word "中央" (central)), as shown in FIG. 3C. The user can select any of the completion candidates 324 (by hitting a candidate key 306 with the desired completion candidate 324) to form the word, or the user can write a new input into the handwriting area 304 (i.e., ignore the completion candidates 324). In some implementations, the completion candidates are identified by searching a dictionary for multi-character words/phrases that contain the pertinent character(s) in the current input 322 (e.g., the last character(s) in the current input 322). In this way, the completion candidates 324 provide a word or phrase "auto-complete" functionality to the entry of Chinese text.

In some implementations, additional candidate characters beyond those identified by the engine can be identified and presented. In some implementations, the additional candidate characters include extension candidates, synthetic candidates, and/or composition candidates, further details of which are described below.

Synthetic Candidates

Figure 4:
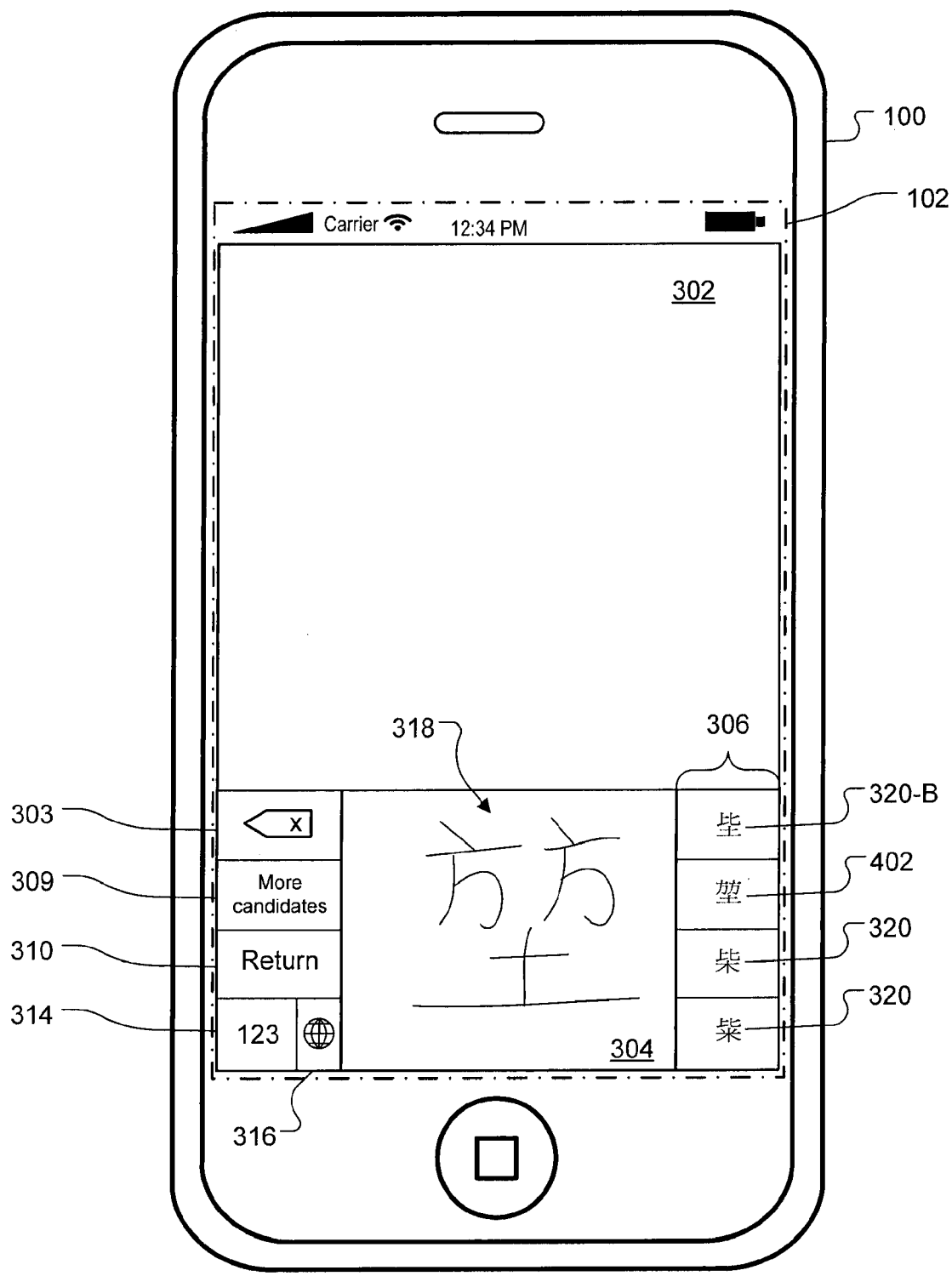
FIG. 4 illustrates an example of synthetic candidates.

FIG. 4 illustrates an example of synthetic candidates. In FIG. 4, a handwritten input is written into the handwriting area 304. One or more candidate characters 320 are identified by a handwriting recognition engine and presented in the candidate keys 306. In addition to the candidates 320, one or more synthetic candidates 402 can be identified and presented in the candidate keys 306. In some implementations, the synthetic candidates 402 for a particular candidate 320 are presented right after the particular candidate 320 in the "list" of candidates. The user can select a synthetic candidate 402 by hitting the appropriate candidate key 306.

For example, for the handwritten input 318 as shown in FIG. 4, candidates 320 are identified by the handwriting recognition engine. For candidate 320-B ("坒"), synthetic candidate 402 ("𡉀"), which resembles candidate 320-B, is identified and presented to the user for possible selection by the user.

A synthetic candidate, as used in this specification, is a candidate character that resembles a candidate 320 identified by the handwriting recognition engine. A synthetic candidate can be a better actual match to the handwritten input 318 than any of the engine-identified candidates 320, but is not identified by the recognition engine because, for example, the synthetic candidate character is not in the dictionary used by the recognition engine.

In some implementations, possible synthetic candidates are stored in memory 250 as a table or another dictionary (e.g., in language data 276) that maps characters in a dictionary that is used by the recognition engine 277 to characters that resemble the characters in the recognition engine dictionary. When a candidate 320 is identified by the recognition engine 277, the synthetic candidates table/dictionary can be searched for the candidate 320, and the synthetic candidate(s) to which the candidate 320 is mapped are identified and presented.

In some implementations, the functionality of the identification and presentation of synthetic candidates is affected by how the handwriting recognition engine handles a handwritten input that the engine does not recognize. For example, if the handwriting recognition engine, when presented with a handwritten input that it cannot recognize, outputs a relatively small set of "best guess" characters as candidates, then synthetic candidates can be identified and presented. If, on the other hand, the handwriting recognition engine, in the same situation, outputs a relatively large, random set of characters, then identification of synthetic candidates can be inefficient (because synthetic candidates would need to be identified for a large, unpredictable set characters) and thus not performed.

Extension Candidates

Figure 5:
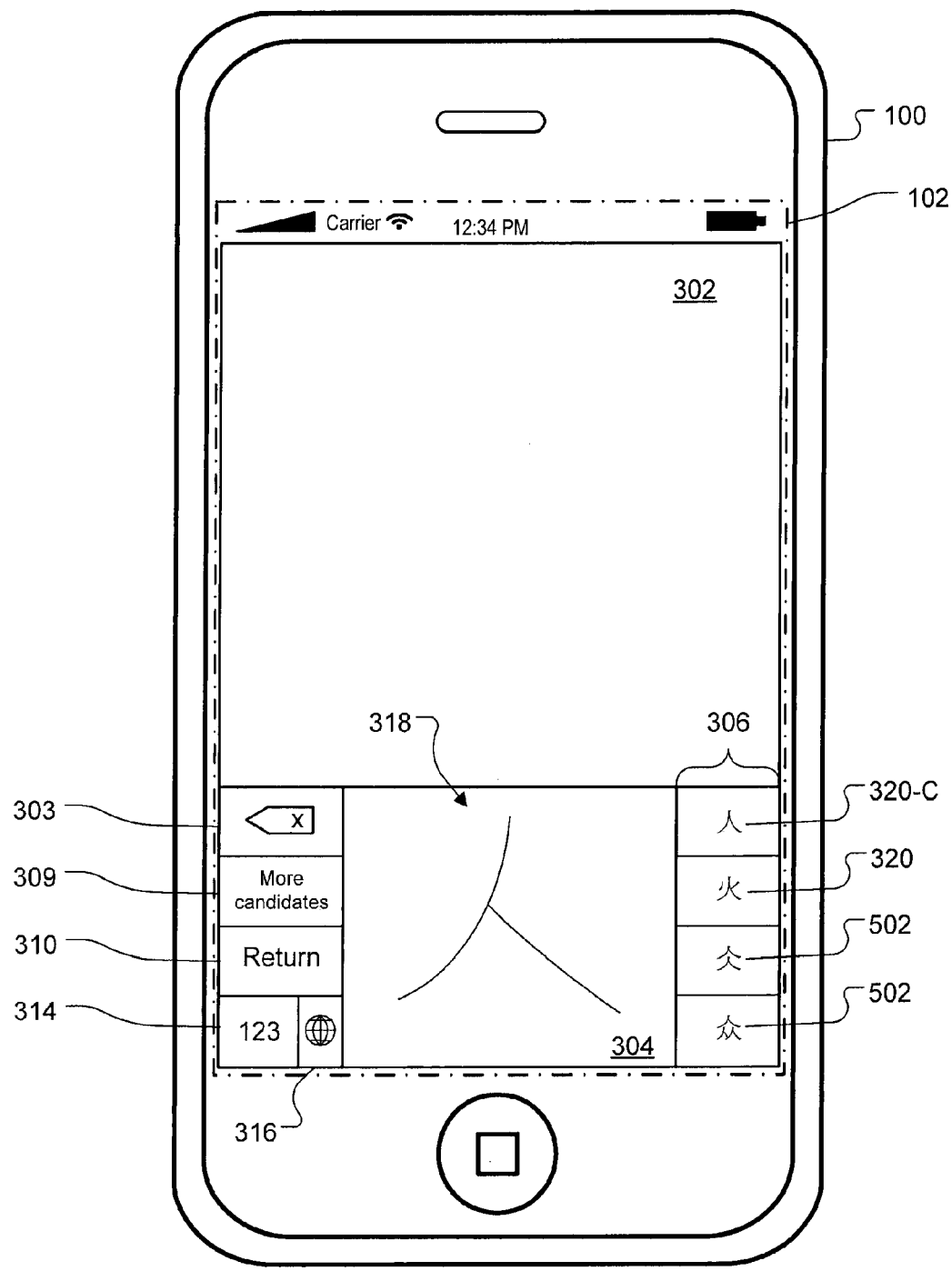
FIG. 5 illustrates an example of extension candidates.

FIG. 5 illustrates an example of extension candidates. In FIG. 5, a handwritten input 318 is written into the handwriting area 304. One or more candidate characters 320 are identified by a handwriting recognition engine and presented in the candidate keys 306. In addition to the candidates 320, one or more extension candidates 502 can be identified and presented in the candidate keys 306. In some implementations, the extension candidates 502 are presented at the end of the "list" of candidates for the handwritten input 318. The user can select an extension candidate 502 by hitting the appropriate candidate key 306.

For example, for the handwritten input 318 as shown in FIG. 5, candidates 320 are identified by the handwriting recognition engine. For candidate 320-C ("人"), extension candidates 502 ("夶", "众") are identified and presented to the user for possible selection by the user.

An extension candidate, as used in this specification, is a candidate character that is related to a candidate 320 identified by the handwriting recognition engine. In some implementations, the relation is based on related semantics or meaning. For example, returning to the example described above, the character "人" means person or people, and "众" (simplified form of "眾") conveys the semantics of "the public" or "the masses (of people)." As another example, for the character "一" (the Chinese character for the numeral one), the Arabic numeral "1" and the Roman numeral "I" can be identified and presented as extension candidates based on related semantics/meaning.

In some implementations, the relation is based on structure; a character that is structurally composed of another character (e.g., structurally composed of multiple instances of that another character) can be identified and presented as an extension candidate for that another character. For example, for the character "金", extension candidates "鉿" and "鑫" can be identified as extension candidates. As another example, "龓" and "龘" can be example extension candidates, based on structure, for "龍".

In some implementations, possible extension candidates are stored in memory 250 as a table or another dictionary (e.g., in language data 276) that maps characters in a dictionary that is used by the recognition engine 277 to related characters. When a candidate 320 is identified by the recognition engine 277, the extension candidates table/dictionary can be searched for the candidate 320, and the extension candidate(s) to which the candidate 320 is mapped are identified and presented.

Composition Candidates

Figure 6A:
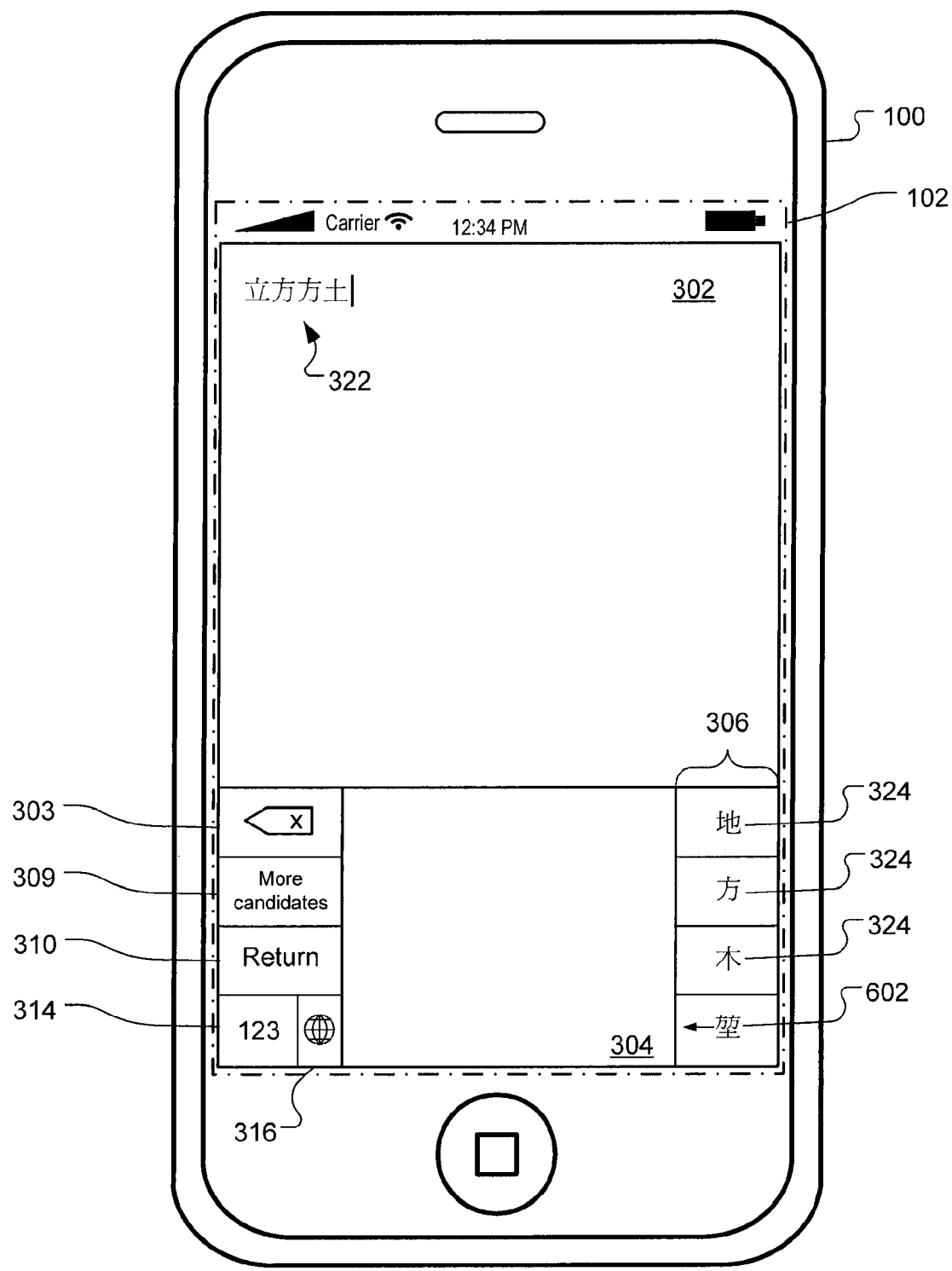
FIGS. 6A-6B illustrate an example of composition candidates.

FIG. 6 illustrates an example of composition candidates. In FIG. 6, a plurality of characters has been entered serially into a string (e.g., by handwriting recognition and selection of candidates as described above) and is shown as the current input 322. One or more completion candidates 324 for the last character ("土") in the current input 322 are identified and presented in the candidate keys 306. In addition to the completion candidates 324, one or more composition candidates 602 can be identified and presented in the candidate keys 306. In some implementations, the composition candidates 602 are presented at the end of the "list," after the completion candidates 324. The user can select a composition candidate 602 by hitting the appropriate candidate key 306. In some implementations, a composition candidate 602 is displayed in a candidate key 306 with an arrow, as shown in FIG. 6, to distinguish the composition candidate from other types of candidates (e.g., the same character provided as synthetic candidate).

For example, for the characters "方方土" in the current input 322 as shown in FIG. 6, completion candidates 324 ("地", "方", "木") are identified and presented based on the character "土". A composition candidate 602 ("垄") for the characters "方方土" in the current input 322 can be identified and presented to the user for possible selection by the user.

A composition candidate, as used in this specification, is a candidate character that is structurally composed of multiple characters in the current input 322. In some implementations, the composition candidate is composed of multiple consecutive characters in the current input 322. For example, returning to the example in FIG. 6, the composition candidate character "垄" includes the characters in the multi-character string "方方土" as components.

In some implementations, possible composition candidates are stored in memory 250 as a table or another dictionary (e.g., in language data 276) that maps characters in a dictionary that is used by the recognition engine 277 to characters that contain the possible composition candidates as components. The composition candidates table/dictionary is searched for one or more characters in the tail end of the current input 322, and the composition candidate(s) to which the characters in the current input 322 are mapped are identified and presented.

Figure 6B:
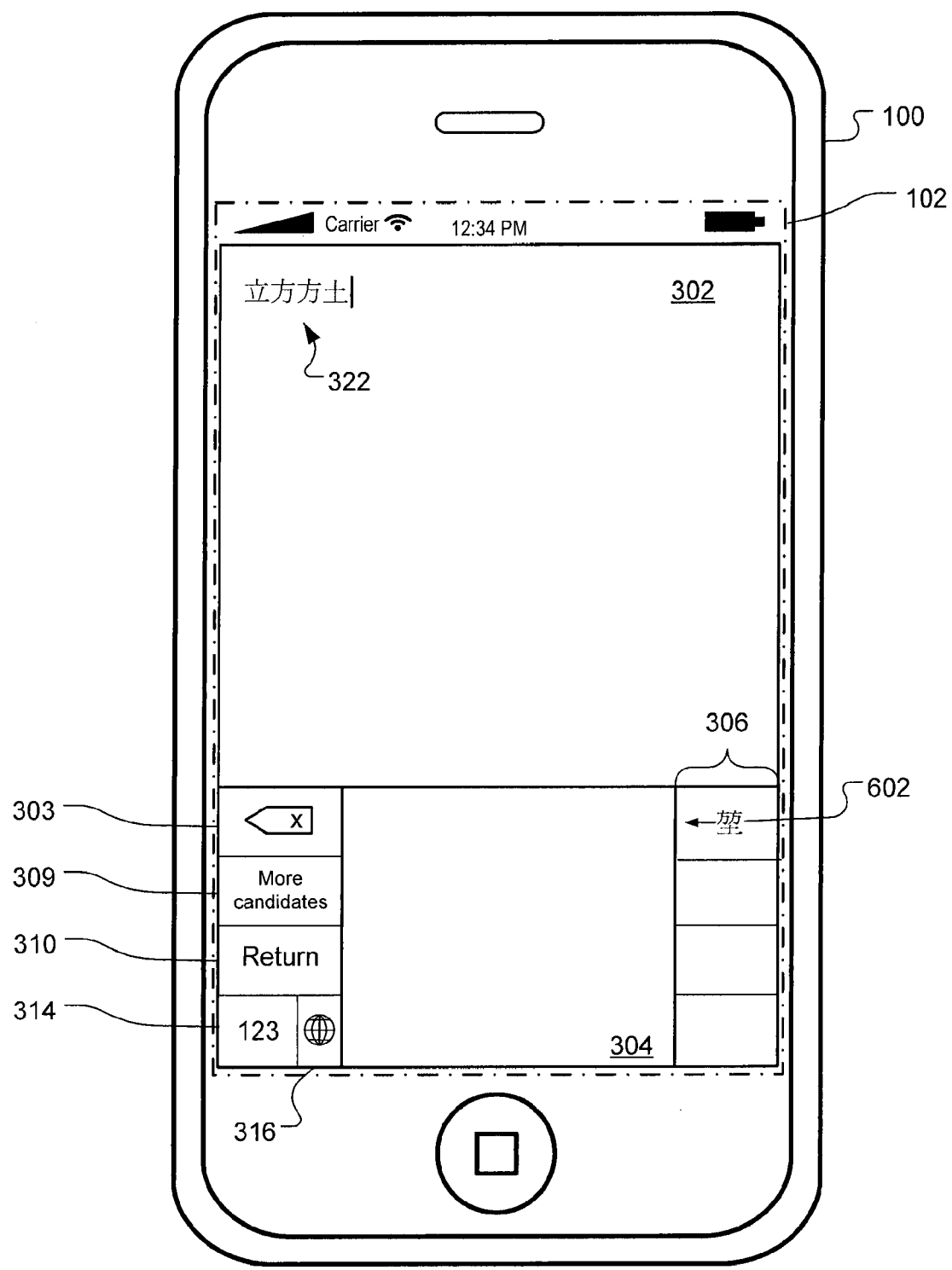

In some implementations, the user can have the device 100 hide the completion candidates 324 and put the composition candidate 602 in the first candidate key 306 (as shown in FIG. 6B, for example) by performing a predetermined gesture on the touch-sensitive display after the plurality of characters is entered (e.g., a pinching gesture in the handwriting area 304).

In some implementations, a user can enter a composition candidate character by "dragging and dropping." For example, returning to the example in FIG. 6, after the string "方方" is entered and the user handwrites "方方土" into the handwriting area 304, the candidate "方方土" is displayed as a candidate 320 in the candidate keys 306. The user can drag and drop the candidate "方方土" from the candidate keys 306 into the composition area 302 and into the proximity of the string "方方" in the current input 322. In response the dragging and dropping, the composition candidate 602 is displayed in the candidate keys 306 instead of the completion candidates 324.

In some implementations, the dictionary or dictionaries for synthetic, extension, and composition candidates are built empirically and installed into the device 100 by the developer or manufacturer of the device 100.

Figure 9:
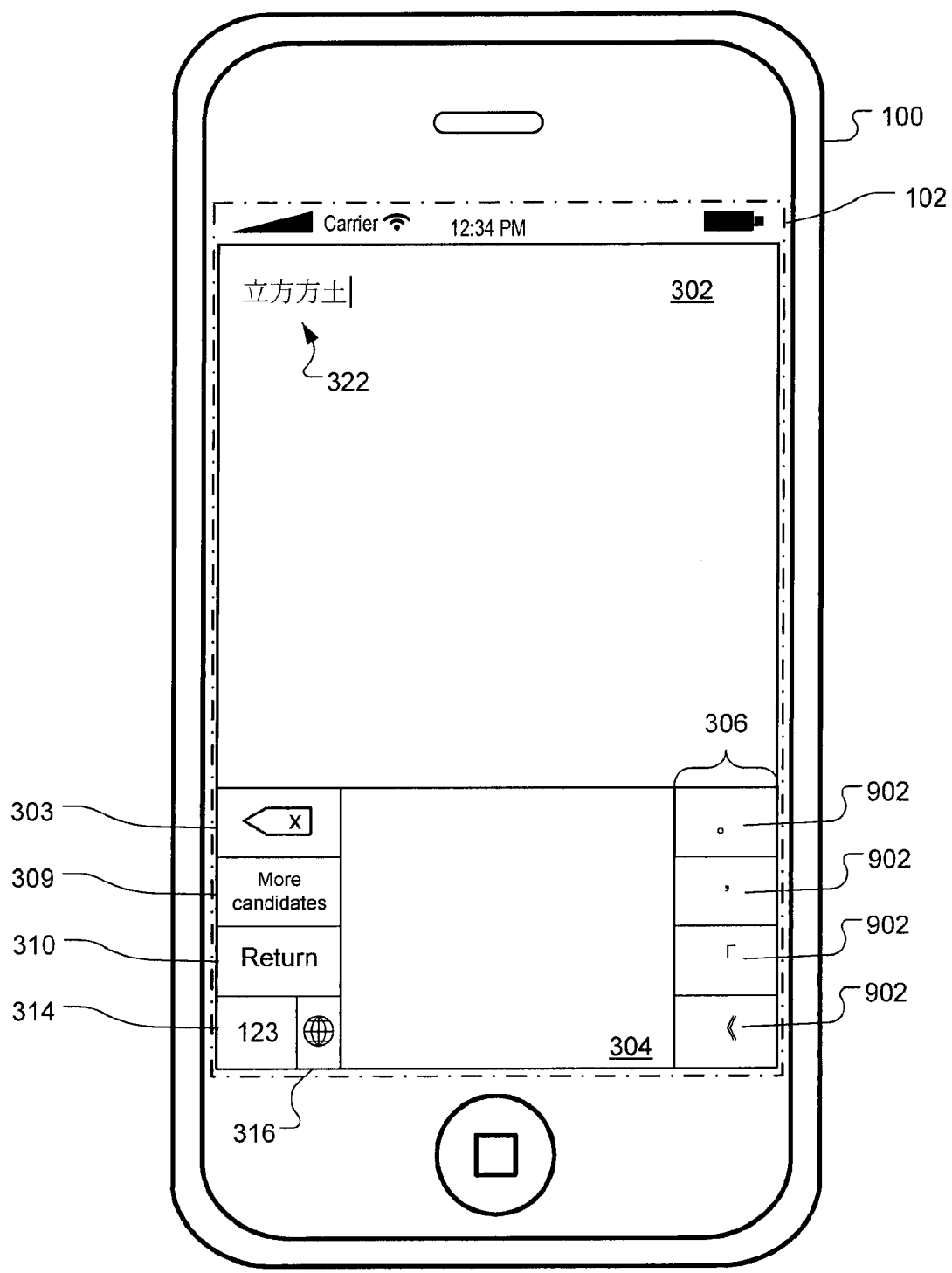
FIG. 9 illustrates an example of punctuation symbol candidates.

In some implementations, if a user taps the handwriting area 304 while the handwriting area 304 is blank, one or more punctuation symbols 902 can be presented to the user as candidates in the candidate keys 306, as shown in FIG. 9. The user can enter a punctuation symbol into the text by selecting the candidate key 306 with the desired punctuation symbol.

Figure 7:
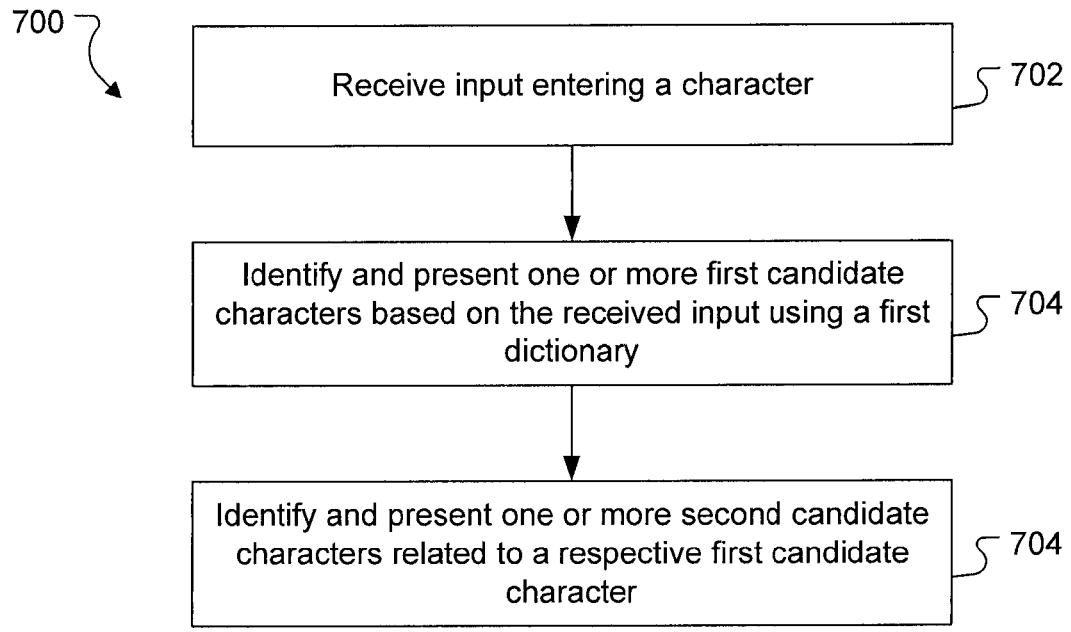
FIG. 7 is a flow diagram illustrating an example process for identifying and presenting candidate characters related to another candidate character.

FIG. 7 is a flow diagram illustrating a process 700 for identifying candidates related to another candidate character. Process 700 is described in reference to a device (e.g., device 100) that performs the process.

An input entering a character is received (702). A user, in an attempt to enter a character, can handwrite an input into a handwriting area 304 of device 100.

One or more first candidate characters are identified, based on the received input and using a first dictionary, and presented (704). The device 100 can recognize the handwritten input and identify one or more candidates from a dictionary that best matches the handwritten input, as recognized by the device 100. The candidates can be presented to the user on a display 102 for selection.

One or more first candidate characters are identified, based on the received input and using a first dictionary, and presented (704). The device 100 can recognize the handwritten input and identify one or more candidates from a dictionary that best matches the handwritten input, as recognized by the device 100. The candidates can be presented to the user on a display 102 for selection.

One or more second candidate characters that are related to a first candidate character are identified and presented (706). The device 100 can identify one or more second candidate characters that are related to any one of the first candidate characters with respect to appearance (e.g., synthetic candidates) or semantics/meaning (e.g., extension candidates). The second candidates can be presented together with the first candidates, so that the user can select the desired candidate.

Figure 8:
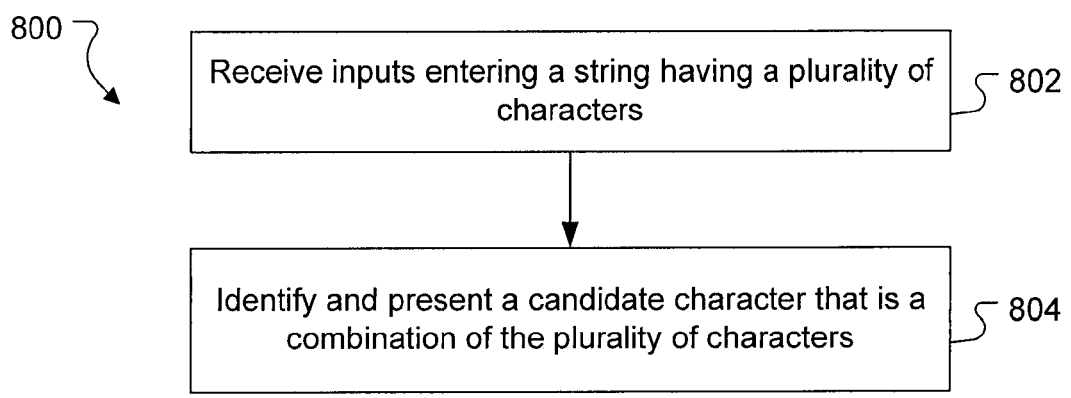
FIG. 8 is a flow diagram illustrating an example process for identifying and presenting a candidate character that includes multiple characters as components.

FIG. 8 is a flow diagram illustrating an example process 800 for identifying and presenting a candidate character that includes multiple characters as components. Process 800 is described in reference to a device (e.g., device 100) that performs the process.

Inputs entering a string having a plurality of characters are received (802). A user can enter a plurality of characters into a device 100 using handwriting and candidate selection as described above.

A candidate characters that is a combination of the plurality of characters is identified and presented (804). The device 100 can look up a table or dictionary for a composition candidate character that is a structural combination of the plurality of characters. The composition candidate can be presented to the user for selection.

In some implementations, the identification of synthetic, extension, and composition candidates is transparent to the user. That is, the user is presented with the candidates as if they are recognized by the recognition engine; the user does not know that the recognition engine does not necessarily include the synthetic, extension, and composition candidates.

It should be appreciated that while the implementations described above are described in reference to an input method based on handwriting recognition, the described implementations can be adapted to other input methods (e.g., keyboard-based input methods).

While this specification contains many specifics, these should not be construed as limitations on the scope of what being claims or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results.

What is claimed is:

1. A method, comprising:
   at a device with a touch-sensitive display, one or more processors, and memory:
      receiving a handwritten input for a logographic character with the touch-sensitive display;
      identifying and presenting one or more first candidate logographic characters for the handwritten input using a first dictionary; and
      identifying and presenting one or more second candidate logographic characters based on a respective first candidate logographic character from among the one or more first candidate logographic characters, wherein the one or more second candidate logographic characters are identified using a mapping in a second dictionary that maps the respective first candidate logographic character to the one or more second candidate logographic characters based on related semantics or meaning of the respective first candidate logographic character.

2. The method of claim 1, wherein the second dictionary, includes mappings from characters in the first dictionary to characters that resemble the characters in the first dictionary.

3. The method of claim 1, wherein identifying and presenting one or more second logographic candidate characters based on the respective first candidate logographic character comprises identifying and presenting one or more extension candidate characters.

4. The method of claim 1, wherein the logographic character is a Chinese character.

5. A device, comprising:
   a touch-sensitive display;
   one or more processors;
   memory; and
   one or more programs, wherein the one or more programs are stored in the memory and configured to be executed by the one or more processors, the one or more programs including instructions for:
      receiving a handwritten input for a logographic character with the touch-sensitive display;
      identifying and presenting one or more first candidate logographic characters for the handwritten input using a first dictionary; and
      identifying and presenting one or more second candidate logographic characters based on a respective first candidate logographic character from among the one or more first candidate logographic characters, wherein the one or more second candidate logographic characters are identified using a mapping in a second dictionary that maps the respective first candidate logographic character to the one or more second candidate logographic characters based on related semantics or meaning of the respective first candidate logographic character.

6. The device of claim 5, wherein the second dictionary includes mappings from characters in the first dictionary to characters that resemble the characters in the first dictionary.

7. The device of claim 5, wherein identifying and presenting one or more second logographic candidate characters based on the respective first candidate logographic character comprises identifying and presenting one or more extension candidate characters.

8. The device of claim 5, wherein the logographic character is a Chinese character.

9. A non-transitory computer-readable medium storing one or more programs, the one or more programs comprising instructions, which when executed by a device with a touch-sensitive display, cause the device to:
   receive a handwritten input for a logographic character with the touch-sensitive display;
   identify and present one or more first candidate logographic characters for the handwritten input using a first dictionary; and
   identify and present one or more second candidate logographic characters based on a respective first candidate logographic character from among the one or more first candidate logographic characters, wherein the one or more second candidate logographic characters are identified using a mapping in a second dictionary that maps the respective first candidate logographic character to the one or more second candidate logographic characters based on related semantics or meaning of the respective first candidate logographic character.

10. The computer-readable medium of claim 9, wherein the second dictionary includes mappings from characters in the first dictionary to characters that resemble the characters in the first dictionary.

11. The computer-readable medium of claim 9, wherein identifying and presenting one or more second logographic candidate characters based on the respective first candidate logographic character comprises identifying and presenting one or more extension candidate characters.

12. The computer-readable medium of claim 9, wherein the logographic character is a Chinese character.

* * * * *